US012679148B2

(12) United States Patent
Ozelo Rodrigues De Mello et al.

(10) Patent No.: US 12,679,148 B2
(45) Date of Patent: Jul. 14, 2026

(54) METHOD FOR MONITORING A STATUS OF A TYRE

(71) Applicant: Pirelli Tyre S.p.A., Milan (IT)

(72) Inventors: Renan Ozelo Rodrigues De Mello, Capuava (BR); Andrea Natta, Milan (IT); Massimiliano Sallusti, Milan (IT); Marian Palka, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 466 days.

(21) Appl. No.: 18/256,885

(22) PCT Filed: Dec. 22, 2021

(86) PCT No.: PCT/IT2021/050421
§ 371 (c)(1),
(2) Date: Jun. 9, 2023

(87) PCT Pub. No.: WO2022/144939
PCT Pub. Date: Jul. 7, 2022

(65) Prior Publication Data
US 2024/0017573 A1 Jan. 18, 2024

(30) Foreign Application Priority Data
Dec. 30, 2020 (IT) ........................ 102020000032795

(51) Int. Cl.
*B60C 11/24* (2006.01)
*B60C 23/06* (2006.01)
*G01M 17/02* (2006.01)

(52) U.S. Cl.
CPC .......... *B60C 11/246* (2013.01); *B60C 23/061* (2013.01); *B60C 23/065* (2013.01); *G01M 17/02* (2013.01)

(58) Field of Classification Search
None
See application file for complete search history.

(56) References Cited

U.S. PATENT DOCUMENTS

| | | | |
|---|---|---|---|
| 6,278,361 B1 | 8/2001 | Magiawala et al. | |
| 9,259,976 B2 | 2/2016 | Singh et al. | |

(Continued)

FOREIGN PATENT DOCUMENTS

| | | |
|---|---|---|
| EP | 1 106 397 A2 | 6/2001 |
| EP | 1878596 A2 | 1/2008 |

(Continued)

OTHER PUBLICATIONS

International Search Report form the European Patent Office in corresponding International Application No. PCT/IT2021/050421 mailed May 2, 2022.

(Continued)

*Primary Examiner* — Matthew G Marini
(74) *Attorney, Agent, or Firm* — Finnegan, Henderson, Farabow, Garrett & Dunner, L.L.P.

(57) ABSTRACT

Method (200), and related system (100), for monitoring a status of a tyre (99) fitted on a vehicle, the method (200) comprising: —in a first operative phase with the tyre (99) in a reference status: —during an advancement of the vehicle, acquiring (3) at least one first signal representative of a motion of a crown portion (31) of the tyre (99); —obtaining (4) a first frequency spectrum of the at least one first signal, the first frequency spectrum comprising a first plurality of peaks; —identifying (5) a first determined peak in the first plurality of peaks and determining a first frequency of the first determined peak; —in a second operative phase subsequent to the first operative phase: —during an advancement of said vehicle, acquiring (6) a second signal representative of the motion of the crown portion (31); —obtaining (7) a second frequency spectrum of the second signal, the second frequency spectrum comprising a second plurality of peaks; —identifying (8) a second determined peak in the second plurality of peaks corresponding to the (Continued)

first determined peak in the first plurality of peaks, and determining (9) a second frequency of the second determined peak; —determining (10) a reference frequency as a function of the first frequency of the first determined peak; —determining (11) a current frequency as a function of the second frequency of the second determined peak; —monitoring (12) the status of the tyre (99) based on a comparison between the current frequency and the reference frequency, or between two values of a same physical quantity, the two values being correlated to the current frequency and to the reference frequency respectively, wherein the physical quantity is a mass or a moment of inertia or a stiffness of the tyre (99).

15 Claims, 3 Drawing Sheets

(56) References Cited

U.S. PATENT DOCUMENTS

| | | | |
|---|---|---|---|
| 11,506,682 | B2 | 11/2022 | Honda |
| 2007/0174002 | A1* | 7/2007 | Kitazaki ................. B60T 8/172 |
| | | | 701/70 |
| 2007/0213953 | A1 | 9/2007 | Kitazaki et al. |
| 2008/0015763 | A1 | 1/2008 | Kitazaki et al. |
| 2010/0199756 | A1 | 8/2010 | Hanatsuka |
| 2014/0366618 | A1 | 12/2014 | Singh et al. |
| 2015/0040656 | A1 | 2/2015 | Singh et al. |
| 2015/0090023 | A1 | 4/2015 | Masago |
| 2018/0154707 | A1 | 6/2018 | Singh et al. |
| 2024/0053228 | A1 | 2/2024 | Sabato et al. |

FOREIGN PATENT DOCUMENTS

| | | | |
|---|---|---|---|
| EP | 2 172 760 | A1 | 4/2010 |
| EP | 2 813 378 | A1 | 12/2014 |
| EP | 2 837 510 | A1 | 2/2015 |
| EP | 3 210 799 | A1 | 8/2017 |
| EP | 3 330 106 | A1 | 6/2018 |
| JP | 2014102554 | A | 6/2014 |
| WO | 2022144703 | A1 | 7/2022 |
| WO | 2022144939 | A1 | 7/2022 |
| WO | 2022144940 | A1 | 7/2022 |

OTHER PUBLICATIONS

Written Opinion of the International Searching Authority from the European Patent Office in corresponding International Application No. PCT/IT2021/050421 mailed May 2, 2022.

International Search Report from the European Patent Office in corresponding International Application No. PCT/IB2021/062184 mailed Apr. 5, 2022.

Written Opinion of the International Searching Authority from the European Patent Office in corresponding International Application No. PCT/IB2021/062184 mailed Apr. 5, 2022.

Office Action issued by the European Patent Office on Aug. 19, 2024, in corresponding European Application No. 21 851 861.1, 4 pages.

International Search Report from the European Patent Office in corresponding International Application No. PCT/IB2021/050422 mailed Apr. 4, 2022.

Written Opinion of the International Searching Authority from the European Patent Office in corresponding International Application No. PCT/IB2021/050422 mailed Apr. 4, 2022.

\* cited by examiner

METHOD FOR MONITORING A STATUS OF A TYRE

This application is a national stage entry application under 35 U.S.C. § 371 of International Application No. PCT/IT2021/050421, filed on Dec. 22, 2021, and claims priority to Italian Application No. 102020000032795, filed Dec. 30, 2020; the contents of each application is incorporated herein by reference in its entirety.

TECHNICAL FIELD OF THE INVENTION

The present invention relates to a method for monitoring a status of a tyre, for example a status of structural integrity or a status of tread wear, and a related system for monitoring a status of a tyre.

STATE OF THE ART

Typically, a tyre for vehicle has a substantially toroidal structure around a rotation axis thereof during operation, and it has an equatorial plane perpendicular to the rotation axis, said equatorial plane being typically a plane of (substantial) geometric symmetry (e.g., ignoring any minor asymmetries, such as the tread design and/or the writing on the sides and/or structure asymmetries or profile asymmetries).

With "inner cavity" it is meant the space delimited by the inner surface of the tyre and by the surface of the rim which faces towards the inner surface of the tyre, when fitted.

With "crown portion" it is meant the portion of tyre placed at the tread band.

The terms "radial" and "axial" are used with reference respectively to a direction substantially perpendicular to and to a direction substantially parallel to the rotation axis of the tyre.

The term "tangential" is used with reference to a direction substantially perpendicular to both the radial direction and the axial direction (e.g., generally oriented according to the rolling direction of the tyre).

The terms lateral, vertical and horizontal refers respectively to the axial direction, the vertical direction and the horizontal direction.

With "footprint" it is meant the portion of outer surface of the tread band which, during the rolling of the tyre fitted and subjected to a load (for example due to the fitting on a vehicle), is in contact at every moment with the rolling surface. The footprint typically has a substantially null curvature (or substantially infinite curvature radius), or in any case it substantially assumes the conformation of the rolling surface.

With "footprint area" it is meant the part of the crown portion that is at the footprint at each moment.

Each of EP2813378, EP3330106, EP3210799 and EP2837510 discloses a method and a related system for estimating the status of wear of a tyre.

SUMMARY OF THE INVENTION

The Applicant has observed that the methods for estimating the wear of a tyre disclosed in EP2813378, EP2837510, EP3330106 and EP3210799 uses a correlation model obtained through experimental measurements which allow to mathematically correlate the inflation pressure of the tyre, the frequency of the vertical vibration mode and/or the torsional vibration mode of the tyre and the thickness of the tread band, the latter quantity being representative of the status of wear of the tyre. These methods for estimating in order to effectively operate require therefore a pre-calibration which has to be carried out for each tyre model and which is aimed to the identification of the coefficients of the correlation model. These coefficients have to be experimentally obtained for each tyre model in a procedural step prior to the fitting of the tyre on the vehicle, for example by using a pre-calibration apparatus (e.g., a rotor on which the tyre is fitted, with the latter being pushed in thrust against a surface that simulates the road). The identification of these coefficients requires to carry out cycles of tests on the tyre, wherein each cycle of tests is carried out for predetermined thickness values of the tread band and applying a plurality of operating conditions (for example inflation pressure, temperature, speed etc.) of the tyre, for each thickness values of the tread band. This pre-calibration step of the tyre can be very expensive if not impossible to carry out, since it has to be carried out for each tyre model (or ideally for each tyre) to be evaluated, including tyres and/or tyre models produced by your own competitors.

This requirement of identification of the coefficients of the correlation model for each tyre and/or tyre model therefore entails a hard implementation of these methods for estimating the wear of a tyre in terms of industrial feasibility, since it would be costly, if not impossible, for a tyre manufacturer to carry out the pre-calibration for each tyre or tyre model of its own production and of the production of its own competitors, as well as in terms of complexity of the method for estimating the wear since it is necessary carrying out a large number of tests on each tyre or tyre model for identifying the coefficients of the model in every possible operating conditions (e.g., inflation pressure and tread thickness) in which the tyre can realistically be during its operative life. This requirement of identification of the coefficients would therefore be applicable only in face of a costly investigation carried out by an expert in the sector (e.g., a qualified operator, a mechanic and/or an expert tyre specialist) which allows to identify the unknown specifics of the tyre necessary to the implementation of the method.

The Applicant has therefore faced the problem of obtaining a method and a system for monitoring the status of a tyre which do not need to carry out a pre-calibration for the tyres and/or the tyre models.

According to the Applicant, one or more of the above problems are solved by a method and a system for monitoring the status of a tyre which carry out a self-calibration based on the frequency of one or more vibration modes of the tyre, and more in particular starting from a frequency obtained with the tyre in a reference status (for example when the tyre is substantially new).

According to an aspect the invention relates to a method for monitoring a status of a tyre fitted on a vehicle, the method comprising:

in a first operative phase with said tyre in a reference status:
  during an advancement of said vehicle, acquiring at least one first signal representative of a motion of a crown portion of said tyre;
  obtaining a first frequency spectrum of said at least one first signal, said first frequency spectrum comprising a first plurality of peaks;
  identifying a first determined peak in said first plurality of peaks and determining a first frequency of said first determined peak;
in a second operative phase subsequent to said first operative phase:

during an advancement of said vehicle, acquiring a second signal representative of said motion of the crown portion;

obtaining a second frequency spectrum of said second signal, said second frequency spectrum comprising a second plurality of peaks;

identifying a second determined peak in said second plurality of peaks corresponding to said first determined peak in said first plurality of peaks, and determining a second frequency of said second determined peak;

determining a reference frequency as a function of said first frequency of said first determined peak;

determining a current frequency as a function of said second frequency of said second determined peak;

monitoring said status of the tyre based on a comparison between said current frequency and said reference frequency, or between two values of a same physical quantity, said two values being correlated to said current frequency and to said reference frequency respectively.

Preferably said physical quantity is a mass or a moment of inertia or a stiffness of the tyre.

According to another aspect the invention relates to a system for monitoring a status of a tyre fitted on a vehicle, the system comprising:

a motion sensor fixed at a crown portion of said tyre and configured for detecting a motion of said crown portion of the tyre;

at least one processing unit in communication with said motion sensor and programmed and configured for:

in a first operative phase with said tyre in a reference status:

during an advancement of said vehicle, acquiring at least one first signal representative of a motion of said crown portion of said tyre;

obtaining a first frequency spectrum of said at least one first signal, said first frequency spectrum comprising a first plurality of peaks;

identifying a first determined peak in said first plurality of peaks and determining a first frequency of said first determined peak;

in a second operative phase subsequent to said first operative phase:

during an advancement of said vehicle, acquiring a second signal representative of said motion of the crown portion;

obtaining a second frequency spectrum of said second signal, said second frequency spectrum comprising a second plurality of peaks;

identifying a second determined peak in said second plurality of peaks corresponding to said first determined peak in said first plurality of peaks, and determining a second frequency of said second determined peak;

determining a reference frequency as a function of said first frequency of said first determined peak;

determining a current frequency as a function of said second frequency of said second determined peak;

monitoring said status of the tyre based on a comparison between said current frequency and said reference frequency, or between two values of a same physical quantity, said two values being correlated to said current frequency and to said reference frequency respectively.

Preferably said physical quantity is a mass or a moment of inertia or a stiffness of the tyre.

The Applicant, without restricting to any theory, has realized that the peaks of the first frequency spectrum and the peaks of the second frequency spectrum are representative of vibration modes of the tyre in two different operative phases, in which the tyre is respectively in the reference status (i.e., in the first operative phase) and in a current status potentially different from the reference status (i.e., in the second operative phase).

For the purposes of the present invention, the Applicant has made the following observations regarding the vibration modes of the tyre, in particular on the first six vibration modes of the tyre, i.e., the first three translational vibration modes and the first three rotational vibration modes, in which the belt layers are substantially not subjected to deformation.

First of all, the Applicant has realized that for a tyre the modal stiffness and the modal mass (or the modal moment of inertia in case of the rotational modes) can be considered mutually independent quantities. In particular, the modal stiffness is substantially determined by the stiffness of the carcass of the tyre, while the modal mass (or the modal moment of inertia) is substantially determined by the mass of the elastomeric compounds, and in particular mainly by the mass of the tread band and in part of the sidewall.

Furthermore, the Applicant has realized that the stiffness of the carcass of the tyre is a parameter which remains substantially constant during the whole operative life of the tyre under the same operating conditions of the tyre (e.g., inner pressure, temperature, vertical load and forward speed) and in conditions of integrity of the tyre.

Furthermore, the Applicant has realized that the stiffness of the carcass of the tyre is mainly dominated by the pressure of the tyre.

From these observations, the Applicant has realized that it is possible monitoring the status of the tyre by comparing a reference frequency and a current frequency, both determined as a function of the modal frequency of a determined vibration mode of the tyre, or two values of a same physical quantity correlated to these frequencies, respectively in a first operative phase in which the tyre is in a reference status, which advantageously can coincide with the tyre in substantially new status (see discussion below), and in a second operative phase subsequent to this first operative phase, i.e. during normal use of the tyre fitted on the vehicle. In fact, the first determined peak and the second determined peak (identified in the respective spectra for example based on the same predetermined selection criteria) are representative of a same, selected, vibration mode, or of a same combination of vibration modes, of the tyre in two temporally spaced apart moments of the life of the tyre.

Therefore, in case there is a deviation of the current frequency (function of the frequency of the second determined peak) from the reference frequency (function of the frequency of the first determined peak), or of the respective values of the physical quantity, it is possible to conclude that there has been a change in the status of the tyre since the frequency of the selected vibration mode/s or the value of the physical quantity correlated to this frequency has changed. The change in the status of the tyre could, for example, consist in a change in the modal mass (or moment of inertia) (e.g., due to wear of the tread band) or in a change in the modal stiffness (e.g., due to a loss of integrity of the tyre, for example due to damage or breakage, which may have caused for example a lowering of the inner pressure of the tyre and/or a damage to the carcass).

Following these observations and considerations, the Applicant has realized that the method and the system for monitoring the status of a tyre of the present invention are reliable in determining possible changes in the status of a tyre and also have various advantages.

According to the Applicant, the determination of the reference frequency makes it possible monitoring the status of a tyre during normal use of the vehicle. In other words, the method for monitoring according to the present invention allows to carry out a self-calibration of the tyre fitted on the vehicle in the first operative phase (for example in the first kilometres of use of the tyre), without the need to carry out a specific pre-calibration for each tyre and/or tyre model. This makes the monitoring of the status of a tyre according to the present invention industrially and effectively feasible.

Furthermore, according to the Applicant, the monitoring of the modal frequency of the selected vibration mode(s) allows to give a quick, reliable and effective feedback/indication on a possible change of the status in which the tyre is with respect to the reference status, verifying for example the occurrence of a wear phenomenon and/or a damage of the carcass and/or a loss of integrity of the tyre (e.g., damage and/or breakage). The monitoring is easy to implement, being sufficient the determination of the modal frequency of the selected vibration mode(s), obtainable from the signal (after frequency decomposition) acquired through a suitable sensor, without the need to know any parameters, quantities and/or structural properties of the tyre that could be difficult to find.

Another advantage associated with the monitoring of the status of a tyre according to the present invention is the possibility of obtaining such monitoring directly and potentially continuously during the normal use of the vehicle, to full advantage of driving safety.

The present invention in one or more of the aforesaid aspects can have one or more of the following preferred features.

Preferably said at least one processing unit is programmed and configured for carrying out any one of the embodiments of the method of the present invention.

Preferably said mass or moment of inertia or stiffness are respectively a modal mass or a modal moment of inertia or a modal stiffness of said tyre.

Preferably said mass or moment of inertia or stiffness are correlated to the respective frequency by the following mathematical formula:

$$k = f^2 \cdot m$$

wherein k is said stiffness, f is said respective frequency and m is said mass or said moment of inertia.

The Applicant has realized that, for example for the aforesaid first six vibration modes of the tyre, the aforesaid function correlates the modal stiffness k (which typically depends on one or more operating parameters of the tyre, described below), the modal frequency f (which typically depends on said one or more operating parameters) and the modal mass m for the translational modes, or the moment of inertia m for the rotational modes, (which typically do not depend on the value of the operating parameters).

Preferably each of said first frequency (of the first determined peak) and said second frequency (of the second determined peak) is a modal frequency of a same vibration mode (or a same combination of vibration modes) of the tyre, more preferably selected in the following group of vibration modes: lateral translational, vertical translational, horizontal translational, torsional around the rotation axis of the tyre (Y), torsional around the vertical axis (Z) and torsional around the horizontal axis (X). In this way, in particular for the first six vibration modes of the tyre, frequencies easily identifiable in the frequency spectrum are used.

In one particularly preferred embodiment said same vibration mode is the lateral translational mode. The Applicant has in fact verified that this mode is sufficiently distinct and identifiable in the frequency spectrum with respect to the other modes, i.e., its frequency is not disturbed by others vibration modes.

Preferably said at least one first signal and said second signal are accelerometric signals representative of at least one component of a, more preferably linear, acceleration undergone by said crown portion of said tyre, more preferably by a portion of inner surface of the tyre belonging to said crown portion of said tyre. In this way signals allowing, after the frequency processing, an identifiable representation of the peaks in the frequency spectrum are acquired by a sensor installed on a protected part of the tyre, as its inner cavity.

In one embodiment said at least one first signal and said second signal are speed (or displacement/deformation) signals representative of at least one (axial, radial and/or tangential) component of a linear speed (or of a displacement/deformation) of said crown portion of the tyre, more preferably of said portion of inner surface of the tyre belonging to said crown portion of said tyre.

Preferably said motion sensor is an accelerometric (or a speed or a displacement/deformation) sensor configured for detecting at least one component (up to three components) of a, more preferably linear, acceleration (or of a speed or of a displacement/deformation) undergone by said crown portion of said tyre, more preferably by a portion of inner surface of the tyre belonging to said crown portion of said tyre. Preferably said motion sensor is fixed at said portion of inner surface.

Preferably said at least one component of the acceleration is selected in the group: axial component, radial component and tangential component. In this way the first vibration modes of the tyre are efficiently detected. In one particularly preferred embodiment said at least one component of the acceleration is the axial component. In this way the lateral translational mode is efficiently detected.

Preferably said acquiring said at least one first signal is carried out at a respective first value of one or more operating parameters of said tyre and said method comprises detecting said respective first value of said one or more operating parameters.

Preferably said one or more operating parameters of said tyre are selected in the group: pressure, forward speed, temperature and vertical load.

Preferably said acquiring said second signal is carried out at a respective current value of said one or more operating parameters of said tyre and said method comprises detecting said respective current value of said one or more operating parameters.

In this way the operating parameters that could affect the stiffness of the carcass of the tyre, and thus the modal frequencies, are controlled.

Preferably the system comprises a pressure sensor, more preferably mounted onto said tyre, for detecting a pressure of the tyre, the pressure sensor being connected to said at least one processing unit.

In one embodiment the system comprises a speed sensor, more preferably mounted onto said vehicle, for detecting a forward speed of the vehicle, the speed sensor being connected to said at least one processing unit.

In one embodiment the system comprises a temperature sensor for detecting an inner temperature of the tyre, the temperature sensor being connected to said at least one processing unit.

In this way it is possible monitoring a potential change of the operating parameters of the tyre between the first and the second operative phase, which could limit the reliability of the method.

Preferably said determining said reference frequency comprises determining a trend of said reference frequency as a function of said one or more operating parameters of said tyre.

Preferably said determining said reference frequency comprises identifying in said trend of the reference frequency a value of said reference frequency at said respective current value of said one or more operating parameters.

In one embodiment said determining said trend of the reference frequency comprises, in said first operative phase:

acquiring a plurality of first signals representative of said motion of the crown portion, each at a respective first value of said one or more operating parameters, and detecting said respective first value of said one or more operating parameters, more preferably at least a respective first value of pressure (said respective first values being preferably at least in part different from each other);

obtaining a respective first frequency spectrum of each first signal, said respective first frequency spectrum comprising a respective first plurality of peaks;

in each respective first spectrum, identifying a respective first determined peak and determining a respective first frequency of the respective first determined peak.

In this embodiment said determining said trend of the reference frequency further comprises in said first or second operative phase, correlating said respective first frequencies with the respective first values of said one or more operating parameters, more preferably with the respective first values of pressure, for obtaining said trend of the reference frequency.

In one embodiment said determining said trend of the reference frequency uses a predetermined mathematical function between said first frequency and said respective first values of said one or more operating parameters.

In this way the method is particularly simple to implement and reliable: the monitoring of the status of the tyre can be carried out taking into account the detected operating parameters. In particular, the Applicant has verified that the trend with which the reference frequency varies as a function of the operating parameters, and in particular as a function of the pressure, can be determined once and for all by experimentation on the tyre fitted on the vehicle and/or through physical/mathematical models (which can be applied to a wide class of tyres). This trend of the variation of the reference frequency with the operating parameters can then be used to calculate an expected value that the current frequency should assume during the second operative phase, if no changes have occurred in the status of the tyre.

In one embodiment said predetermined mathematical function is expressed by the following formula:

$$f(p) = \sqrt[2]{f_0^2\left(1 + \alpha_p \frac{p - p_0}{p_0}\right)}$$

wherein f(p) is said reference frequency at a current value p of the pressure; $f_0$ is a first frequency of the first determined peak determined at a first value of pressure $p_0$ and $\alpha_p$ is a mathematical constant. This mathematical function, which according to the Applicant is particularly valid for the lateral translational mode, takes into account at least the pressure which is the operating parameter that mainly affect the stiffness and thus the modal frequency.

Preferably said current frequency coincides with said second frequency of said second determined peak. In this way the method is simplified. In fact, since the trend of the reference frequency is determined, from which the reference frequency expected for the current values of the one or more considered operating parameters of the tyre is determined, it is sufficient the comparison with the frequency of the second determined peak for having a comparison between two quantities that take into account the current values of the operating parameters of the tyre and that give an indicative feedback regarding a possible change in the status of the tyre.

In one alternative embodiment, said determining said current frequency comprises determining a trend of said current frequency as a function of one or more operating parameters of said tyre.

In this embodiment said determining said current frequency comprises identifying in said trend of the current frequency a value of said current frequency at said respective first value of said one or more operating parameters.

In this embodiment said reference frequency coincides with said first frequency of said first determined peak.

In this way a simple comparison is made which provides an accurate and reliable feedback on a possible change of the status of the tyre.

Preferably each of said first and second motion signals temporally corresponds to a total number of turns of the tyre greater than or equal to 300, more preferably greater than or equal to 500, and/or less than or equal to 2000. The Applicant has experimentally verified that this range of values is a good compromise between high reliability and precision of the spectral analysis (dependent on the temporal length of the acquired signal) and the related request of memory capacity, processing capacity, acquisition time and/or energy consumption.

Preferably said at least one first signal and said second signal comprise respectively a first and second plurality of motion signal portions temporally corresponding to a first and a second plurality of continuous time intervals, respectively.

Preferably each continuous time interval of the first and of the second plurality of time intervals is temporally separated from the (temporally) subsequent continuous time interval of the respective plurality of continuous time intervals. In other words, the first motion signal is obtained by acquiring signal portions at time intervals of a first plurality time intervals spaced apart with respect to each other, just as the second motion signal is obtained by acquiring signal portions at time intervals of a second plurality of time intervals spaced apart with respect to each other.

The Applicant has verified that in this way it is possible to obtain, after the frequency processing of the first and second signals, an improvement in the reliability and/or the identification accuracy of the first and second determined peak, and thus of the related frequency, as well as making the method compatible with a normal use of a vehicle. The Applicant has in fact realized that the acquisition conditions of the first and second motion signals during the use of the tyre significantly affect the quality (in terms of information content) of the obtained first and second frequency spectrum and consequently also the subsequent estimate of the status of the tyre. In particular, the Applicant has realized that for improving the quality, the reliability and the precision of the method and for accurately identifying different status of the tyre (for example different levels of wear of the tyre) it is advantageous acquiring the first and second signal varying the excitation conditions of the tyre, to completely excite it. The acquisition of a motion signal made of different portions not temporally consecutive and therefore representative of temporally and spatially spaced apart conditions of the advancement of the vehicle makes reasonably possible the acquisition of signal portions representative of different excitation conditions of the tyre and of its vibration modes, thus making the information content of the resulting frequency spectrum richer and more complete. Furthermore, this technique allows to obtain the signal, albeit in different acquisitions, on a (typically predetermined) sufficient total number of turns, respecting the acquisition conditions of the method, compatibly with a normal use of the vehicle (during which the conditions vary in an unpredictable way and regardless of the requirements of the present method).

Typically, each portion of the first and second motion signal temporally corresponds to at least one turn of said tyre, more preferably to a plurality of turns of the tyre.

Preferably said acquiring said at least one first signal (preferably each first signal of said plurality of first signals) and/or said second signal is carried out provided that a forward speed of the vehicle is greater than or equal to 20 km/h, more preferably greater than or equal to 30 km/h, and/or less than or equal to 80 km/h, more preferably less than or equal to 70 km/h. The Applicant has verified that in this range of forward speed of the vehicle it is possible obtaining a good quality of the motion signal for the frequency processing.

Preferably said acquiring said at least one first signal (preferably each first signal of said plurality of first signals) and said second signal comprises acquiring a respective raw signal representative of said motion of said crown portion and filtering from the respective raw signal, more preferably eliminating from the respective raw signal or reducing a value of, a part of the raw signal temporally corresponding (at least) to each passage of said crown portion (and/or of said motion sensor) in a footprint area of the tyre. In this way it is filtered the part of the motion signal in which the crown portion is substantially constrained to the rolling surface, and therefore poorly or not at all correlated to the selected vibration modes, allowing to improve the quality of the signal.

Preferably said identifying said first and second determined peak (and preferably each respective first determined peak) is carried out based on same predetermined criteria.

Preferably said predetermined criteria comprises:

in each of said first and second frequency spectrum (and preferably in each respective first frequency spectrum), ordering the peaks of respectively said first and second (and preferably respective first) plurality of peaks, assigning a sequential (for example increasing) order n to an increasing value of the frequency of each peak in the frequency spectrum;

in said first frequency spectrum and in said second frequency spectrum (and preferably in each respective first frequency spectrum), identifying a respective peak of same order n, said respective peak of order n of said first and second frequency spectrum (and preferably of each respective first frequency spectrum) being said first and second determined peak (and said respective first determined peak) respectively.

In this way the peaks representative of a same vibration mode (or a same combination of vibration modes) of the tyre are selected.

In one embodiment in which said at least one first signal and said second signal are representative of an axial component of the motion, preferably said order n is equal to one.

Preferably said predetermined criteria comprises:

in said first frequency spectrum and in said second frequency spectrum (and preferably in each respective first frequency spectrum), identifying a respective peak in a predetermined frequency range, more preferably going from 20 Hz (more preferably from 25 Hz, even more preferably from 30 Hz) up to 100 Hz (more preferably up to 80 Hz, even more preferably up to 60 Hz).

The Applicant has realized that when a motion (e.g., accelerometric) signal representative of the axial component of the motion (e.g., of the acceleration) is acquired and the frequency spectrum of the signal is obtained, the peak of order one in the frequency spectrum, which usually is located in the aforesaid frequency range (and therefore can be identified according to the order and/or according to the frequency position), represents the first lateral translational vibration mode of the tyre. The Applicant believes that this mode is particularly advantageous to be used for monitoring the status of the tyre since it is easily identifiable in the frequency spectrum since it is located in a portion of the frequency spectrum wherein the contribution of the other vibration modes of the tyre is substantially absent and therefore it is the only evident peak in this portion of the frequency spectrum. The Applicant has discovered that the lateral translational vibration mode is substantially free of interference from the other vibration modes of the tyre and/or it is not substantially influenced by factors extrinsic to the vibration phenomenon, but it is (substantially) only influenced by the status in which the tyre is when the motion signal is acquired. Consequently, a change in the frequency of the lateral translational vibration mode allows obtaining a direct and unambiguous indication of a corresponding change of the status in which the tyre is, thus making accurate and reliable the determination of the status of the tyre.

Preferably said reference status is a status of undamaged and not worn tyre (i.e., the tyre is substantially new, except for a minimum mileage as explained below). In this way the reference status represents an acceptable status of the tyre.

Preferably it is provided determining said reference status provided that said vehicle has travelled a predetermined distance since when the tyre in a new status is fitted. For example, said distance is greater than or equal to 300 km, more preferably greater than or equal to 500 km, and preferably less than or equal to 1000 km. In this way it is possible allowing the relaxation of the tyre, which releases the tensions accumulated during the production process (in particular during the vulcanization step), without however the tyre being significantly worn. It is thus possible eliminating from the monitoring of the status of the tyre any initial transitory phase of the operative life of the tyre in which the tyre still has a configuration that does not reflect the one it will then assume for the remaining part of its operative life (unless of structural failure).

In one embodiment it is provided determining said reference status by monitoring over time said first frequency of said first determined peak, and assuming said reference status provided that a value of said first frequency stabilizes over time (for example it varies within a close interval in a suitable mileage). In this way the reference status is directly detected on each tyre, without the need of a predetermined minimum distance to be travelled.

Preferably said method comprises determining a reference modal mass (or a reference modal moment of inertia) of the tyre.

Preferably said reference modal mass is greater than or equal to 60%, more preferably greater than or equal to 65%, and/or less than or equal to 85%, more preferably less than or equal to 82%, of a total mass of said tyre.

In one embodiment said method comprises:

(more preferably during said first operative phase) calculating a reference modal stiffness of the tyre as a function of said reference modal mass (or of said reference modal moment of inertia) of the tyre and said first frequency of said first determined peak;

during said second operative phase, calculating a current modal mass (or a current modal moment of inertia) as a function of: said current frequency, said reference modal stiffness, a respective current value and a respective first value of one or more operating parameters of the tyre, more preferably a respective current value and a respective first value of at least the pressure of the tyre;

monitoring said status of the tyre based on a comparison between said current modal mass and said reference modal mass (or between said current modal moment of inertia and said reference modal moment of inertia).

In this way, the method is particularly simple to implement and reliable for the calculation of the wear of the tyre since the calculation of the reference modal stiffness allows during the second operative phase to directly calculate the current modal mass and therefore evaluate a possible loss of mass of the tyre with respect to the first operative phase in which the modal mass coincides with the reference modal mass (physically linked to the modal frequency by the mathematical formula that allows the calculation of the reference modal stiffness). As highlighted above, the Applicant has in fact verified that the function with which the modal stiffness varies as a function of the operating parameters, and in particular as a function of the pressure, can be determined once and for all by experimentation and/or by means of physical/mathematical models (which can be applied to a wide class of tyres). This variation function of the modal stiffness with the operating parameters therefore allows, once the current frequency has been determined, to determine the current modal mass (i.e., the modal mass during the second operative phase) from which it will then be possible to determine a possible change in the status of the tyre by comparison with the reference modal mass (i.e., the modal mass with the tyre in the reference status).

In one embodiment said monitoring said status of the tyre is carried out in a discrete way during said second operative phase. For example, the monitoring of the status of the tyre can be carried out every specific distance (e.g., greater than or equal to 300 km and/or less than or equal to 800 km) travelled by the vehicle. In this way, according to the Applicant, it is possible having a reliable monitoring of the status of the tyre, in particular regarding the wear, without incurring in excessive wastes of energy, in particular for the inner battery of the monitoring system.

In one embodiment said monitoring said status of the tyre is carried out in a substantially continuous way during said second operative phase. For example, the monitoring of the status of the tyre can be carried out every specific distance (e.g., less than or equal to 100 km) travelled by the vehicle. In this way it is possible monitoring almost continuously any changes of the current frequency with respect to the reference frequency, also detecting the single contribution of the wear and loss of structural integrity phenomena that generate an inverse change of the current frequency with respect to the reference frequency.

Preferably said status of the tyre comprises a status of loss of structural integrity of said tyre.

Preferably the method comprises determining a status of loss of structural integrity of said tyre provided that said current frequency is less than said reference frequency.

Preferably said status of the tyre comprises a status of wear of said tyre.

Preferably the method comprises determining a status of wear of said tyre provided that said current frequency is greater than said reference frequency.

The Applicant has in fact realized that, at least for the first six vibration modes of the tyre in which the belt layers are not subjected to deformation, the square of the modal frequency (f) is directly proportional to the modal stiffness (k) and inversely proportional to the modal mass (m), with the three quantities that are linked by the mathematical formula $$f = \sqrt[2]{\frac{k}{m}}.$$

Since, as mentioned above, the modal stiffness is substantially determined by the stiffness of the carcass while the modal mass is substantially determined by the mass of the elastomeric compounds, these quantities remain substantially constant or at most decrease during the operative life of the tyre (the other operating parameters of the tyre remaining unchanged): for example a significant increase in the stiffness of the carcass or an increase in the mass of the elastomeric compounds is typically not possible during use of the tyre. Therefore, in the event of wear of the tyre in which, for example, a reduction in the tread mass occurs, there will be a decrease in the modal mass of the tyre with respect to the reference modal mass (the one when the tyre is new and not worn), with a consequent increase in the modal frequency. Conversely, in the event of a loss of structural integrity in which the stiffness of the carcass decreases, a reduction in the modal stiffness will occur with respect to the reference modal stiffness (the one when the tyre is in the reference status), with a consequent decrease in the modal frequency.

Preferably the method comprises calculating a modal mass (percentual and/or absolute) reduction as a function of said current frequency and of said reference frequency (and preferably of said current and reference modal mass in case of absolute reduction). Preferably said modal mass reduction is calculated as a function of a quadratic ratio between said reference frequency and said current frequency (or a ratio between said current and reference modal mass).

Preferably it is provided calculating a wear of a tread of said tyre as a function of said modal mass reduction.

Preferably the method comprises calculating a modal stiffness (percentual and/or absolute) reduction as a function of said current frequency and of said reference frequency (and preferably of said current and reference modal stiffness in case of absolute reduction). Preferably said modal stiffness reduction is calculated as a function of a quadratic ratio between said current frequency and said reference frequency (or a ratio between said current and reference modal stiffness).

DETAILED DESCRIPTION OF SOME EMBODIMENTS OF THE PRESENT INVENTION

The features and advantages of the present invention will be further clarified by the following detailed description of some embodiments of the present invention, presented by way of non-limiting example, with reference to the attached figures.

Figure 1:
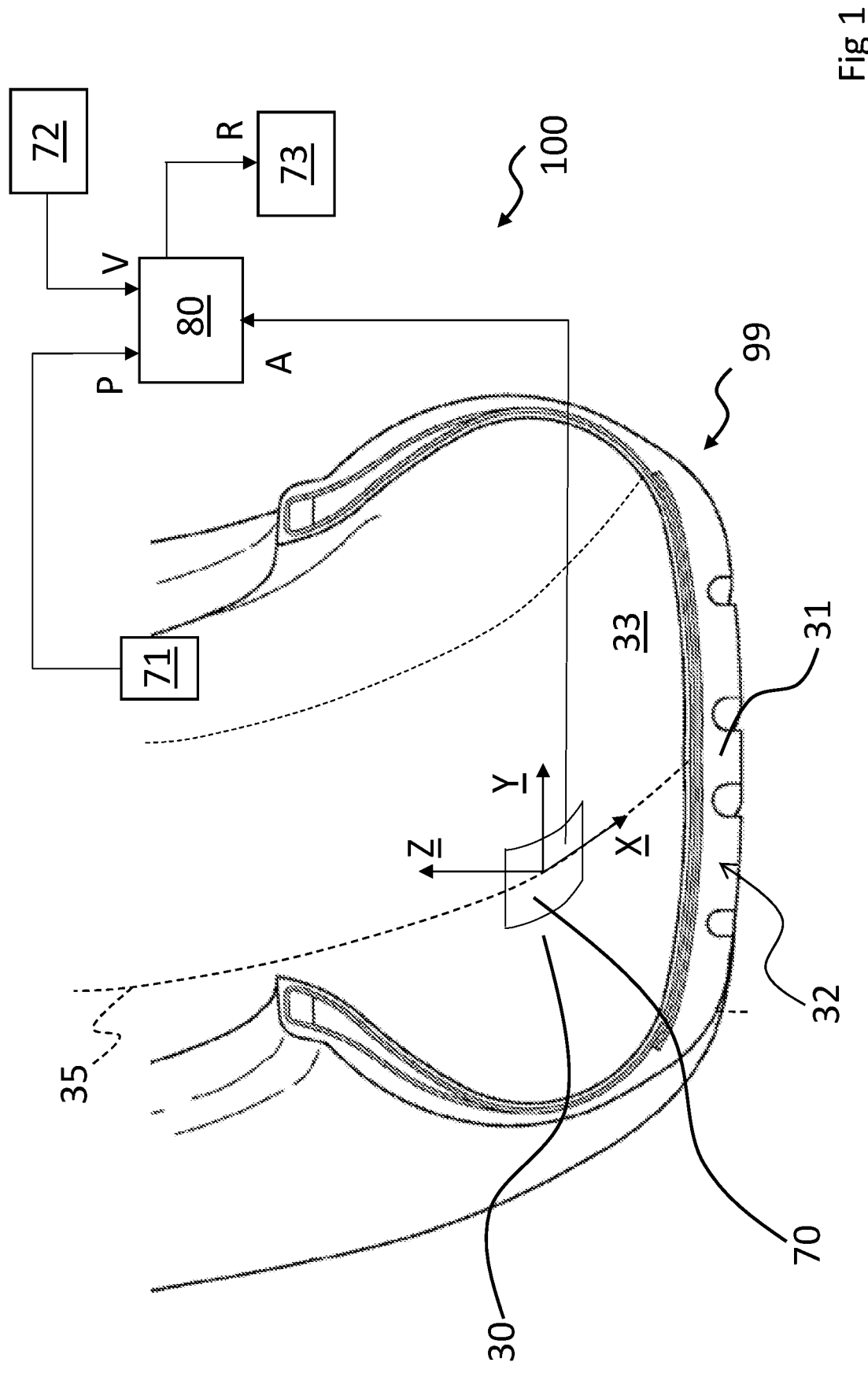
FIG. 1 shows a schematic, perspective and partial view of a section of tyre comprising a motion sensor belonging to the system for monitoring according to the present invention, schematized in the figure.

In FIG. 1 with the reference number 100 a system for monitoring a status of a tyre 99 according to the present invention is schematically shown. The system 100 comprises a motion sensor 70, for example a triaxial accelerometric sensor, fixed to a portion 30 of the inner surface 33 of the tyre 99 belonging to a crown portion 31 of the tyre (i.e., the portion of tyre at the tread band 32). Preferably the sensor is mounted at a median plane of the tyre (indicated by the dashed line 35). All figures are shown not to scale, for illustrative purposes only.

The accelerometric sensor 70 is advantageously placed so that its three axes are aligned respectively with the axes X (along the longitudinal direction), Y (along the axial direction) and Z (along the radial direction) and it is configured to separately detect a tangential component (directed along the X axis), an axial component (directed along the Y axis) and a radial component (directed along the Z axis) of the linear acceleration undergone by the portion 30 of inner surface 33 of the tyre.

The system for monitoring 100 comprises a processing unit 80 in communication, for example through the (for example wireless) communication line A, with the accelerometric sensor 70 to receive an accelerometric signal representative of the three components of the detected linear acceleration.

The present invention contemplates any arrangement and logical and/or physical partition of the processing unit, which can for example be a single physical and/or logical unit or composed of several distinct and cooperating physical and/or logical units, such units being possibly placed, in whole or in part, in the accelerometric sensor, in the tyre, in the rim, on board the vehicle (not shown) on which the tyre 99 is fitted, and/or in a remote station in connection with the vehicle on which the tyre 99 is fitted.

Exemplarily the processing unit 80 is connected, exemplarily by communication line R (with or without wires), to a display device 73, for example the screen of the on-board computer of the vehicle, for transmitting the result of the monitoring of the status of the tyre.

Exemplarily the system for monitoring 100 also comprises a pressure sensor 71, exemplarily fixed in the valve or on the inner surface of the tyre 99 (for example next to the sensor 70), and configured to detect a pressure of the tyre 99 (i.e., the inflation pressure of the tyre into the inner cavity of the tyre). The pressure sensor 71 is in communication, for example through the (for example wireless) communication line P, with the processing unit 80 for transmitting the measured pressure value.

Exemplarily the system for monitoring 100 comprises a speed sensor 72, exemplarily mounted on the vehicle, and configured to detect a forward speed of the vehicle (and consequently of the tyre 99). The speed sensor 72 is in communication, for example through the communication line V (with or without wires), with the processing unit 80 for transmitting the measured forward speed value.

Exemplarily the processing unit 80 is programmed and configured to carry out the operations described below.

Figure 2:
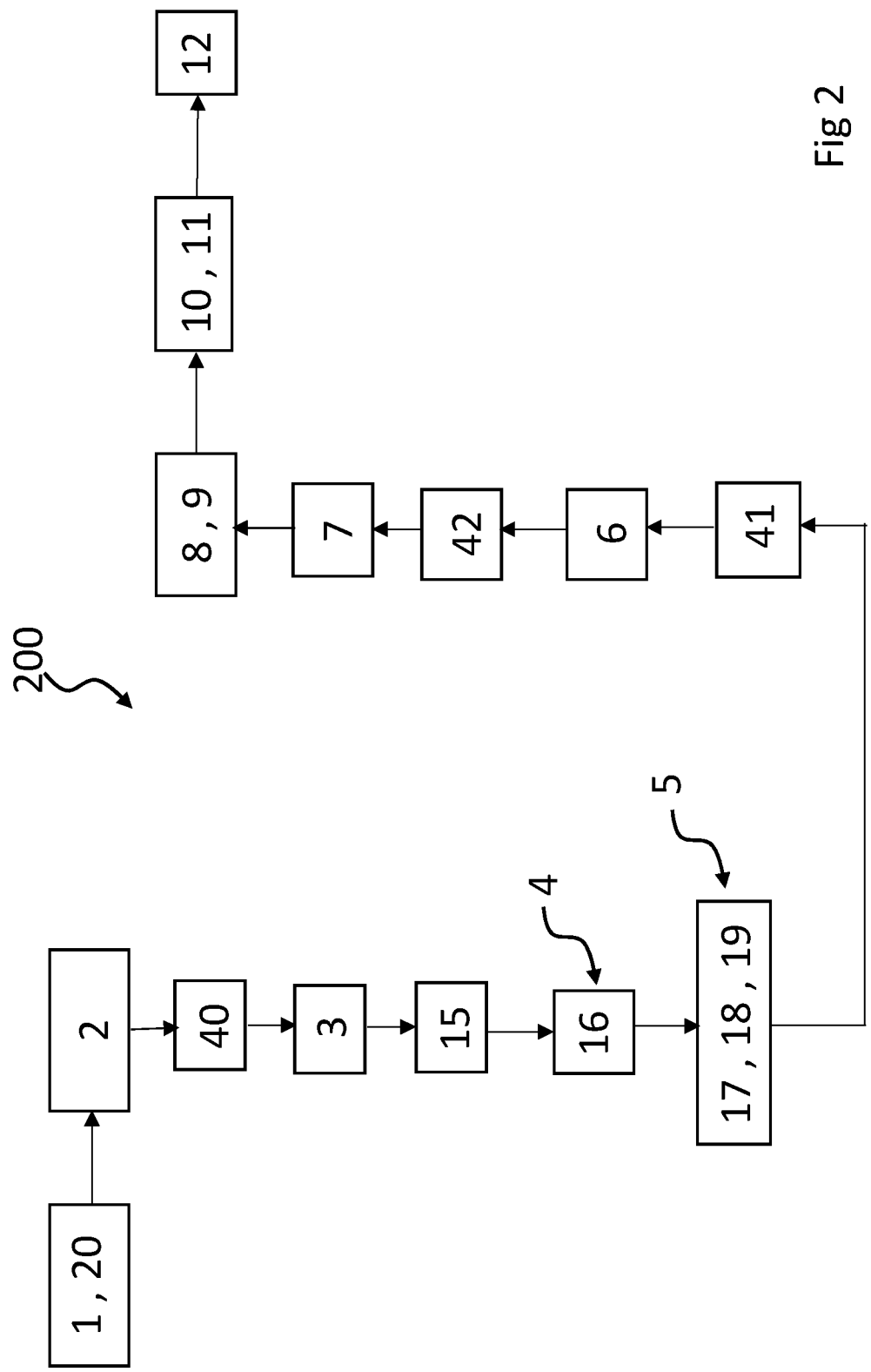
FIG. 2 shows a flow diagram of a method for monitoring the status of a tyre according to one embodiment of the present invention.

FIG. 2 shows a flow diagram of the operations of an example of a method for monitoring 200 a status of a tyre 99 according to the present invention, which can be implemented with the system for monitoring 100 described above.

Preferably the tyre 99 is fitted 1 on the vehicle and is inflated 20 to a desired pressure, exemplarily equal to the operating pressure of the tyre, for example equal to 200 kPa.

Exemplarily the method 200 comprises determining 2 (for example entering in the processing unit at the time of the fitting of the tyre) a reference modal mass of the tyre. In general, the reference modal mass is a parameter that depends on the chosen tyre type, and has a value equal to about 75% of the total mass of the tyre 99 for standard tyres, a value equal to about 70% of the total mass of the tyre for tyres having the bead area thicker than the tread area and a value equal to about 80% of the total mass of the tyre for tyres having the bead area thinner than the tread area.

Subsequently, in a first operative phase, which exemplarily starts when the vehicle has travelled about 500 km from the condition of new tyre, with the tyre 99 in a reference status (in the example the status of relaxed tyre, i.e., that has released the internal stresses due to the production process, e.g., to the vulcanization, but still in a status of perfect structural integrity and of not worn tread) the method 200 comprises the following operations.

Exemplarily it is provided detecting 40 a first pressure value and acquiring 3 a first accelerometric signal at the first pressure value. Exemplarily the first accelerometric signal is representative of only the axial component of the linear acceleration undergone by the portion 30 of inner surface 33.

Alternatively, the first accelerometric signal can be representative of another component of the linear acceleration, or of a combination of components. In this embodiment it is advantageous also detecting a first value of the forward speed of the vehicle at which the first accelerometric signal is acquired.

In one not shown embodiment, it is also provided determining a first value of a load index acting on the tyre, for example calculated as a function of the length of a footprint of the tyre and the detected pressure.

Exemplarily a raw accelerometric signal is first acquired, for example the continuous signal generated by the sensor (exemplarily comprising a plurality, for example hundreds, of turns of the tyre).

Exemplarily this raw accelerometric signal comprises a respective plurality of accelerometric signal portions, each signal portion temporally corresponding to a continuous time interval (exemplarily corresponding to at least one complete turn, typically tens of complete turns, of the tyre), wherein each time interval is temporally separated from a subsequent time interval.

Exemplarily it is provided carrying out a series of filtering operations 15 on the raw accelerometric signal in order to eliminate any disturbances. In particular, it is provided filtering from the raw accelerometric signal, for example reducing in value by a Hanning window, a part of the signal temporally corresponding to each passage of the crown portion 31 in the footprint area of the tyre 99.

The first accelerometric signal is thus obtained.

Through frequency analysis, a first frequency spectrum of the first accelerometric signal is obtained 4, the first frequency spectrum comprising a first plurality of peaks. For example, the first frequency spectrum is obtained calculating a fast Fourier transform (FFT) 16 or by carrying out a PSD (Power Spectral Density) operation on the first accelerometric signal.

It is provided identifying 5 a first determined peak of the first plurality of peaks and determining a first frequency of the first determined peak (i.e., the frequency at which the first determined peak occurs).

Exemplarily identifying 5 the first determined peak in the first frequency spectrum comprises:

identifying 17 each peak of the first plurality of peaks, for example by identifying the inflection points with a positive second derivative within the frequency spectrum (or by identifying the points having a null first derivative and a positive second derivative within the frequency spectrum);

ordering 18 the peaks by assigning a sequential (for example increasing) order n with an increasing value of the frequency at which each peak occurs;

selecting 19 the peak of order one, which, for example, lies within the frequency range 30-80 Hz.

Figure 3:
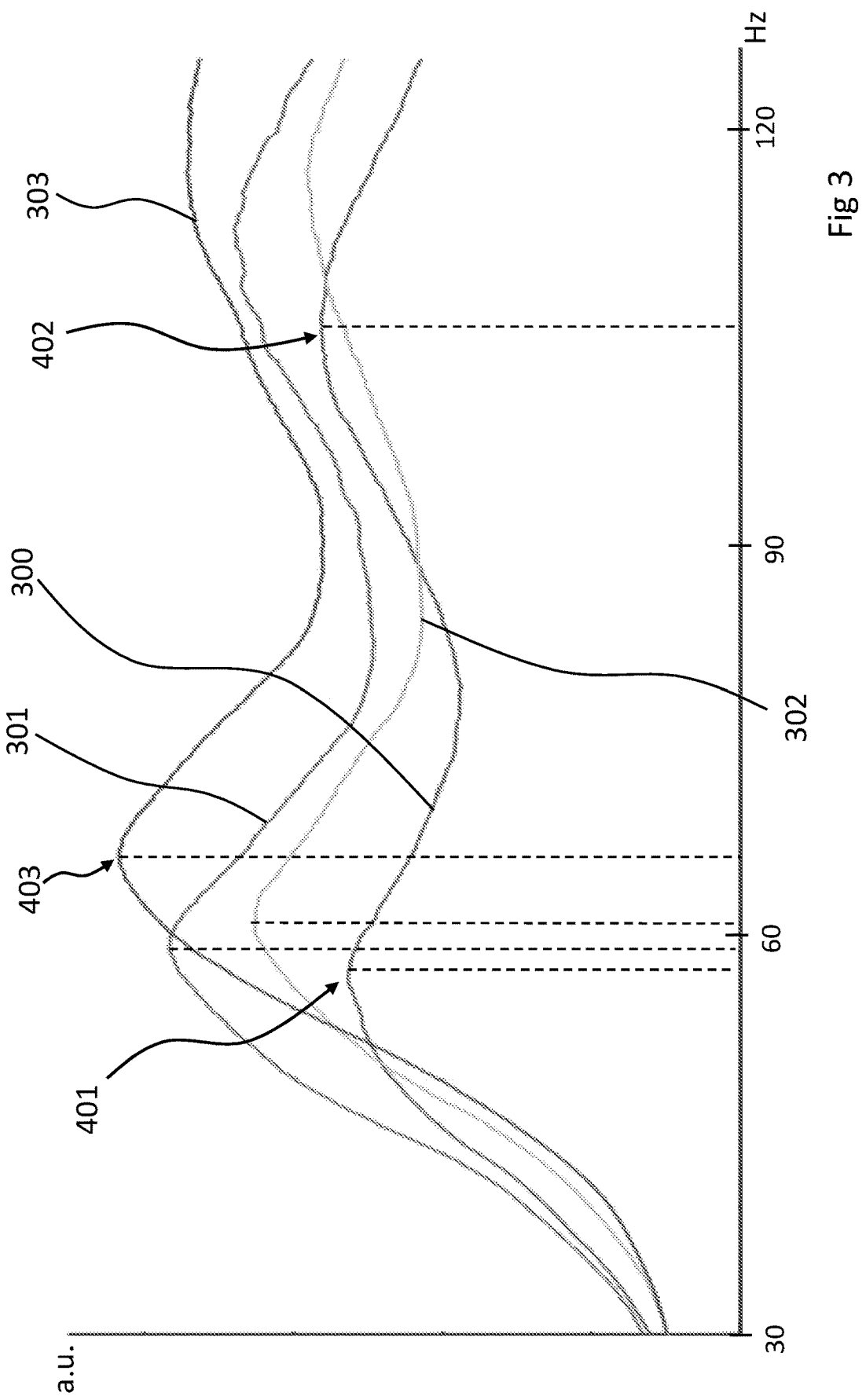
FIG. 3 schematically shows an example of a frequency spectrum obtained respectively for four different wear values of the tread band of a tyre applying the method of the present invention.

For example, in FIG. 3 the curve 300 represents a portion comprised between 30 and 120 Hz of a first frequency spectrum obtained for a not worn tyre, in which the peaks of order one (indicated with the number 401) and of order two (indicated by the number 402), and the respective frequencies, are at least partially visible.

Exemplarily the processing unit 80 is configured for storing the first frequency, i.e., the frequency value of the first determined peak.

In one embodiment the acquisition of the accelerometric signal is carried out for a plurality of first values of the pressure of the tyre (for example, the acquisition of the accelerometric signal is carried out when the pressure sensor detects a change in the pressure of the tyre with respect to the inflation pressure with stationary tyre), and on each accelerometric signal a respective frequency spectrum is obtained on which the respective first determined peak and the relative frequency are identified as explained above.

Subsequently, in a second operative phase, which for example begins after travelling 1000 km, the method 200 comprises carrying out the following operations, exemplarily after travelling every 50 km:

i) detecting 41 a current value of the pressure of the tyre;

ii) acquiring 6 a second accelerometric signal (also representative of the lateral component of the acceleration undergone by the portion 30 of the inner surface 33) at the current value of the pressure. The acquisition of the accelerometric signal in the second operative phase respects the same conditions as the acquisition of the accelerometric signal in the first operative phase, and the second accelerometric signal is built as explained above for the first accelerometric signal. In the event that the accelerometric signal is representative of another acceleration component or a combination of acceleration components, it is provided detecting also a current value of the forward speed of the vehicle;

iii) filtering 42 the part of the second accelerometric signal comprising the footprint area as exemplarily explained above for the first accelerometric signal;

iv) exemplarily after the filtering 42, obtaining 7 a second frequency spectrum of the second accelerometric signal, the second frequency spectrum comprising a second plurality of peaks. For example, the second frequency spectrum is also obtained by applying a fast Fourier transform (FFT) or a PSD operation on the second accelerometric signal;

v) identifying 8 a second determined peak in the second plurality of peaks which corresponds to the first determined peak in the first plurality of peaks. In other words, the second determined peak is identified in the second frequency spectrum based on the same identification criteria as the first determined peak in the first frequency spectrum. Exemplarily also the second determined peak is the peak of order one in the second frequency spectrum and it is within the frequency range 30-80 Hz;

vi) determining 9 a second frequency of the second determined peak (i.e., the frequency at which the second determined peak occurs).

With reference to FIG. 3, curves 301, 302 and 303 represent a portion comprised between 30 and 120 Hz of three different exemplary frequency spectra obtained in the second operative phase for three different wear values of the tyre 99 (respectively 2 mm, 4 mm and 6 mm of wear). For each of these curves, the peaks of order one (within the frequency range 30-80 Hz) and (at least partially) of order two (above 80 Hz), and the respective frequencies, are visible.

Preferably, exemplarily after detecting the current value of the pressure, it is provided determining 10 a reference frequency as a function of the first frequency, of the current value of the pressure and of the first value of the pressure, for example by the following mathematical formula:

$$f(p) = \sqrt[2]{f_0^2 \left(1 + \alpha_p \frac{p - p_0}{p_0}\right)}$$

wherein f(p) is the reference frequency calculated at the current value p of the pressure; $f_0$ is the first frequency of the first determined peak determined at the first pressure value $p_0$ and $\alpha_p$ is a predetermined mathematical constant, for example equal to 0.74. The use of a mathematical model as the one above makes it sufficient to determine the first frequency at a single pressure value. In the aforesaid embodiment in which the first frequency is determined for different pressure values, it is also possible interpolating the mathematical model with these values, or to build a trend of the reference frequency with the pressure as a function of the acquired experimental data, or a combination of the two approaches.

Preferably it is provided determining 11 a current frequency which exemplarily coincides with the second frequency of the second determined peak.

Subsequently, the method 200 comprises monitoring 12 the status of the tyre based on a comparison between the reference frequency and the second frequency, for example for determining a status of loss of integrity and/or a status of wear of the tyre.

Exemplarily the status of wear of the tyre is determined if the second frequency is greater than the reference frequency, and exemplarily a modal mass percentual reduction (corre-
lated to the wear phenomenon) is calculated using the
following formula:

$$\Delta m \% = \frac{f_0^2}{f^2} * 100$$

wherein $\Delta m \%$ is the modal mass percentual reduction, $f_0$ is
the reference frequency, and f is the second frequency.
Alternatively, it is also possible to calculate a current modal
mass of the tyre, i.e., the residual modal mass of the tyre due
to the wear phenomenon, exemplarily by the formula:

$$m = m_0 * \left(\frac{f_0^2}{f^2}\right)$$

wherein m is the current modal mass and $m_0$ is the reference
modal mass (acquired before fitting the tyre on the vehicle).
From the current modal mass m or from the value of
modal mass reduction $\Delta m \%$ it is then possible deriving the
tread thickness lost due to wear, as a function of physical and
geometric parameters of the tyre, for example the density of
the compound, the initial width and the initial thickness of
the tread band.
Exemplarily the status of loss of integrity of the tyre is
determined if the second frequency is less than the reference
frequency, and exemplarily a modal stiffness percentual
reduction (correlated to the phenomenon of loss of structural
integrity) is calculated using the following formula:

$$\Delta k \% = \frac{f^2}{f_0^2} * 100$$

wherein $\Delta k \%$ is the modal stiffness percentual reduction.

The invention claimed is:
1. A method for monitoring a status of a tyre fitted on a
vehicle, the method comprising:
in a first operative phase with the tyre in a reference
status:
during an advancement of the vehicle, acquiring at least
one first signal representative of a motion of a crown
portion of the tyre;
obtaining a first frequency spectrum of the at least one
first signal, wherein the first frequency spectrum
comprises a first plurality of peaks; and
identifying a first determined peak in the first plurality
of peaks and determining a first frequency of the first
determined peak; and
in a second operative phase subsequent to the first opera-
tive phase:
during an advancement of the vehicle, acquiring a
second signal representative of the motion of the
crown portion;
obtaining a second frequency spectrum of the second
signal, wherein the second frequency spectrum com-
prises a second plurality of peaks;
identifying a second determined peak in the second
plurality of peaks corresponding to the first deter-
mined peak in the first plurality of peaks, and deter-
mining a second frequency of the second determined
peak;

18 determining a reference frequency as a function of the
first frequency of the first determined peak;
determining a current frequency as a function of the
second frequency of the second determined peak;
and
monitoring the status of the tyre based on a comparison
between the current frequency and the reference
frequency, or between two values of a same physical
quantity, wherein the two values correlated to the
current frequency and to the reference frequency
respectively, and wherein the physical quantity is a
mass, or a moment of inertia, or a stiffness of the
tyre;
wherein a motion sensor fixed at the crown portion of
the tyre is configured to detect the motion of the
crown portion of the tyre and acquire the at least one
first signal and the at least one second signal.
2. The method according to claim 1, wherein the mass, or
moment of inertia, or stiffness are respectively a modal
mass, or a modal moment of inertia, or a modal stiffness of
the tyre, wherein the mass, or moment of inertia, or stiffness
are correlated to the respective frequency by a formula:

$$k = f^2 \cdot m$$

wherein k is the stiffness, f is the respective frequency and
m is the mass or the moment of inertia,
wherein each of the first frequency and the second fre-
quency is a modal frequency of a same vibration mode
of the tyre, wherein the vibration mode is chosen from:
lateral translational, vertical translational, horizontal
translational, torsional around the rotation axis of the
tyre (Y), torsional around the vertical axis (Z) and
torsional around the horizontal axis (X), wherein the at
least one first signal and the second signal are accel-
erometric signals representative of at least one compo-
nent of a linear acceleration undergone by the crown
portion of the tyre, and wherein the at least one
component of the acceleration is chosen from axial
component, radial component, and tangential compo-
nent.
3. The method according to claim 2, wherein the at least
one component of the acceleration is the axial component
and wherein the same vibration mode is the lateral transla-
tional mode.
4. The method according to claim 1, wherein acquiring the
at least one first signal is carried out at a respective first value
of one or more operating parameters of the tyre, wherein the
method further comprises detecting the respective first value
of the one or more operating parameters; wherein the
acquiring the second signal is carried out at a respective
current value of the one or more operating parameters of the
tyre, wherein the method further comprises detecting the
respective current value of the one or more operating
parameters; wherein the one or more operating parameters
of the tyre are chosen from: pressure, forward speed, tem-
perature and vertical load; wherein the determining the
reference frequency comprises determining a trend of the
reference frequency as a function of the one or more
operating parameters of the tyre and identifying in the trend
of the reference frequency a value of the reference frequency
at the respective current value of the one or more operating
parameters; and wherein the current frequency coincides
with the second frequency of the second determined peak.
5. The method according to claim 4, wherein the deter-
mining the trend of the reference frequency comprises, in the
first operative phase:

acquiring a plurality of first signals representative of the motion of the crown portion, each at a respective first value of the one or more operating parameters, and detecting the respective first value of the one or more operating parameters, the respective first values are at least in part different from each other;

obtaining a respective first frequency spectrum of each first signal, wherein the respective first frequency spectrum comprising a respective first plurality of peaks;

in each respective first spectrum, identifying a respective first determined peak and determining a respective first frequency of the respective first determined peak; and in the first or second operative phase, correlating the respective first frequencies with the respective first values of the one or more operating parameters for obtaining the trend of the reference frequency, or the determining the trend of the reference frequency uses a predetermined mathematical function between the first frequency and the respective first values of the one or more operating parameters.

6. The method according to claim 1, wherein identifying the first and second determined peak is carried out based on a same predetermined criteria comprising:

in each of the first and second frequency spectrum, ordering the peaks of respectively the first and second plurality of peaks, assigning a sequential order n to an increasing value of the frequency of each peak in the frequency spectrum;

in the first frequency spectrum and in the second frequency spectrum, identifying a respective peak of same order n, wherein the respective peak of order n of the first and second frequency spectrum are the first and second determined peak respectively, or in the first frequency spectrum and in the second frequency spectrum, identifying a respective peak in a predetermined frequency range from 20 Hz up to 100 Hz.

7. The method according to claim 1, wherein the acquiring the at least one first signal and the second signal comprises acquiring a respective raw signal representative of the motion of the crown portion and filtering from the respective raw signal a part of the raw signal temporally corresponding at least to each passage of the crown portion in a footprint area of the tyre.

8. The method according to claim 1, wherein each of the first and second motion signals temporally corresponds to a total number of turns of the tyre greater than or equal to 300, less than or equal to 2000, or the total number of turns of the tyre greater than or equal to 300 and less than or equal to 2000, wherein the at least one first signal and the second signal comprise respectively a first and second plurality of motion signal portions temporally corresponding to a first and a second plurality of continuous time intervals respectively, wherein each time interval of the first and of the second plurality of continuous time intervals is temporally separated from the temporally subsequent continuous time interval of the respective plurality of continuous time intervals, wherein each portion of the first and second motion signal temporally corresponds to a plurality of turns of the tyre, and wherein acquiring the at least one first signal, the second signal, or both is carried out provided a forward speed of the vehicle is greater than or equal to 20 km/h, less than or equal to 80 km/h, or both.

9. The method according to claim 1, wherein the reference status is a status of undamaged and not worn tyre, and the method further comprises determining the reference status of the tyre wherein the vehicle has travelled a predetermined distance greater than or equal to 300 km and less than or equal to 1000 km, when the tyre in a new status is fitted.

10. The method according to claim 1, further comprising determining the reference status by monitoring over time the first frequency of the first determined peak and assuming the reference status, wherein a value of the first frequency stabilizes over time.

11. The method according to claim 1, further comprising:

determining a reference modal mass of the tyre, wherein the reference modal mass is greater than or equal to 60%, less than or equal to 85%, or both of a total mass of the tyre;

during the first operative phase, calculating a reference modal stiffness of the tyre as a function of the reference modal mass of the tyre and the first frequency of the first determined peak;

during the second operative phase, calculating a current modal mass as a function of: the current frequency, the reference modal stiffness, a respective current value, and a respective first value of one or more operating parameters of the tyre chosen from: pressure, forward speed, temperature, and vertical load; and monitoring the status of the tyre based on a comparison between the current modal mass and the reference modal mass.

12. The method according to claim 1, further comprising:

determining a status of loss of structural integrity of the tyre, wherein the current frequency is less than the reference frequency;

or determining a status of wear of the tyre, wherein the current frequency is greater than the reference frequency; and calculating a wear of a tread of the tyre as a function of a modal mass reduction, wherein the modal mass reduction is calculated as a function of a quadratic ratio between the reference frequency and the current frequency.

13. The method according to claim 1, wherein the at least one first signal and the second signal are representative of an axial component of the acceleration, wherein determining the reference frequency comprises determining a trend of the frequency using a predetermined mathematical function according to a formula:

$$f(p) = \sqrt[2]{f_0^2\left(1 + \alpha_p \frac{p - p_0}{p_0}\right)}$$

wherein f(p) is the reference frequency at a current value p of the pressure; $f_0$ is a first frequency of the first determined peak determined at the first value of pressure, $p_0$ and $\alpha_p$ is a mathematical constant, wherein identifying the first and second determined peak is carried out based on the predetermined criteria comprising:

in each of the first and second frequency spectrum, ordering the peaks of respectively the first and second plurality of peaks, assigning a sequential order n to an increasing value of the frequency of each peak in the frequency spectrum and identifying a respective peak of order n equal to one, wherein the respective peak of order n equal to one of the first and second determined peak respectively.

14. A system for monitoring a status of a tyre fitted on a vehicle, the system comprising:

a motion sensor fixed at a crown portion of the tyre to detect a motion of the crown portion of the tyre;

a memory storing instructions; and at least one processing unit in communication with the motion sensor configured to execute the instructions to:

in a first operative phase with the tyre in a reference status:

during an advancement of the vehicle, acquire at least one first signal representative of a motion of the crown portion of the tyre;

obtain a first frequency spectrum of the at least one first signal, the first frequency spectrum comprising a first plurality of peaks;

identify a first determined peak in the first plurality of peaks and determining a first frequency of the first determined peak; and in a second operative phase subsequent to the first operative phase:

during an advancement of the vehicle, acquire a second signal representative of the motion of the crown portion;

obtain a second frequency spectrum of the second signal, the second frequency spectrum comprising a second plurality of peaks;

identify a second determined peak in the second plurality of peaks corresponding to the first determined peak in the first plurality of peaks, and determining a second frequency of the second determined peak;

determine a reference frequency as a function of the first frequency of the first determined peak;

determine a current frequency as a function of the second frequency of the second determined peak; and monitor the status of the tyre based on a comparison between the current frequency and the reference frequency, or between two values of a same physical quantity, wherein the two values are correlated to the current frequency and to the reference frequency respectively, and wherein the physical quantity is a mass or a moment of inertia, or a stiffness of the tyre.

15. The system according to claim 14, wherein the motion sensor is an accelerometric sensor for detecting at least one component of a linear acceleration undergone by the crown portion of the tyre, wherein the motion sensor is fixed at a portion of inner surface of the tyre, and wherein the system comprises:

a pressure sensor mounted onto the tyre for detecting a pressure of the tyre, wherein the pressure sensor is connected to the at least one processing unit;

a speed sensor mounted onto the vehicle for detecting a forward speed of the vehicle, wherein the speed sensor is connected to the at least one processing unit;

a temperature sensor for detecting an inner temperature of the tyre, wherein the temperature sensor is connected to the at least one processing unit, and wherein the at least one processing unit is programmed for carrying out the method for monitoring according to claim 2.

\* \* \* \* \*